Nov. 13, 1928.
H. SCHLAICH
1,691,136
INDOOR-OUTDOOR THERMOMETER
Filed July 6, 1922  3 Sheets-Sheet 1
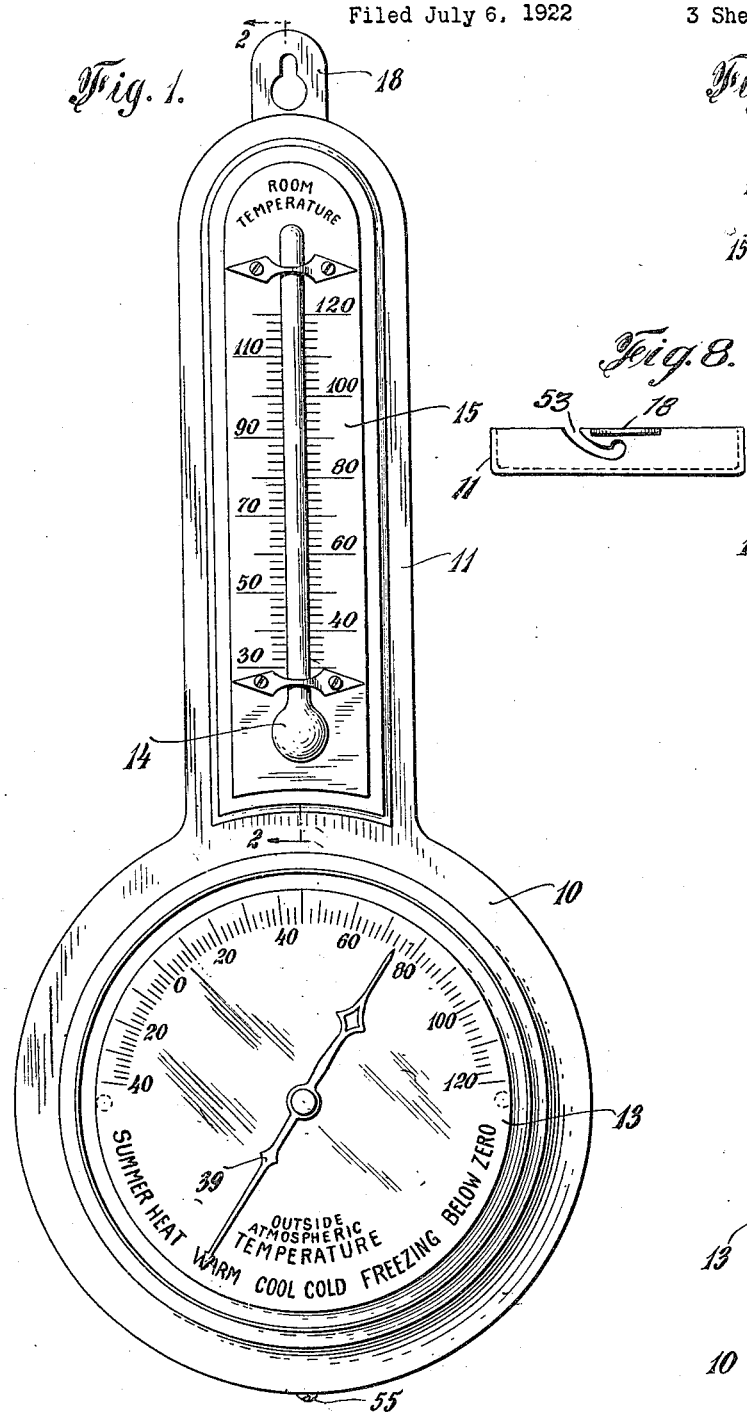
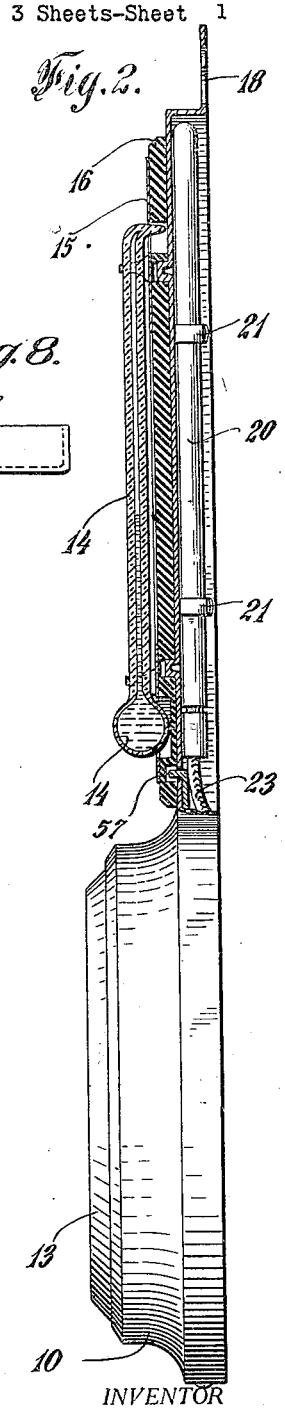
INVENTOR
Herman Schlaich
BY
his ATTORNEYS Nov. 13, 1928.  
H. SCHLAICH  
INDOOR-OUTDOOR THERMOMETER  
Filed July 6, 1922

1,691,136

3 Sheets-Sheet 2

INVENTOR  
Herman Schlaich  
BY *Moses, Hammond, Moses & Wolf*  
his ATTORNEYS

Nov. 13, 1928.

H. SCHLAICH

INDOOR-OUTDOOR THERMOMETER

Filed July 6, 1922 3 Sheets-Sheet 3

1,691,136

INVENTOR
Herman Schlaich
BY Moses, Hammond, Morse Holte
his ATTORNEYS

Patented Nov. 13, 1928.

1,691,136

UNITED STATES PATENT OFFICE.

HERMAN SCHLAICH, OF LONG ISLAND CITY, NEW YORK.

INDOOR-OUTDOOR THERMOMETER.

Application filed July 6, 1922. Serial No. 573,089.

This invention relates to temperature indicating devices, and is particularly altho not exclusively useful in connection with what may be called an indoor-outdoor thermometer, owing to the fact that it provides, at a point within a building, a visual indication of both the temperature within and the temperature without the building.

Generally speaking, one of the characteristic novel features of the invention resides in a frame, adapted to serve as a support for the indoor temperature responsive and indicating means and as a support for the outdoor temperature indicating means, and also adapted to serve as a temporary support for the outdoor temperature responsive element and the flexible connection by which the latter is connected to the outdoor temperature indicating means. Other more detailed features of the invention will appear from the following description and will be pointed out in the appended claims.

Figure 3:
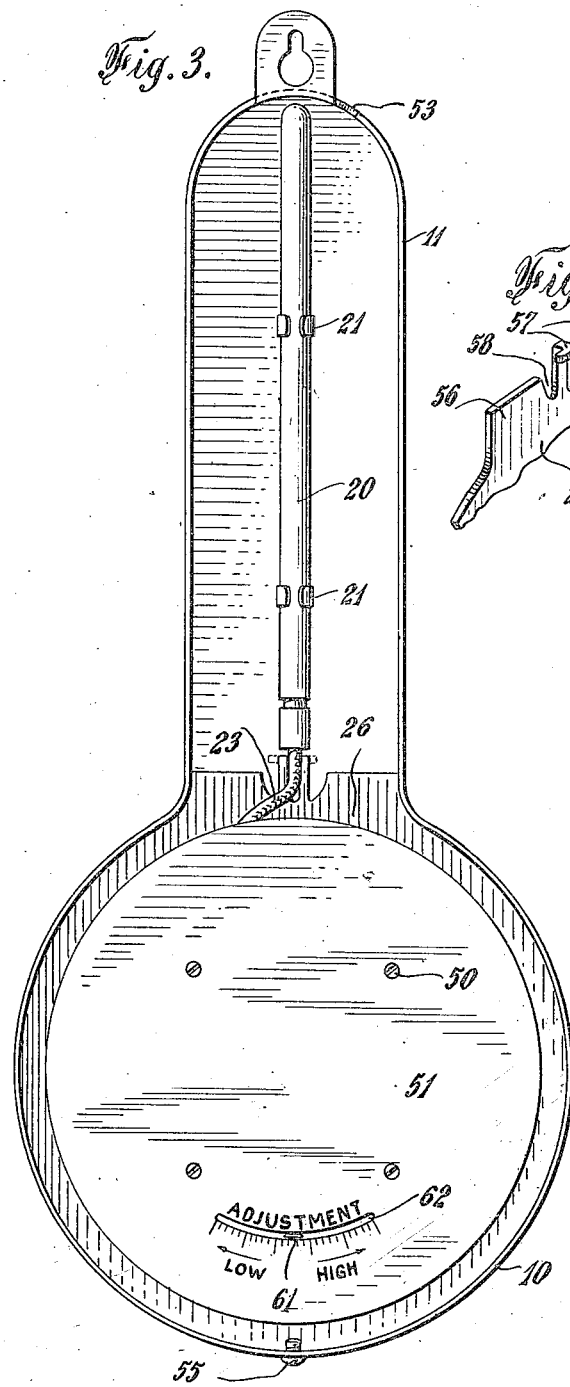
Figure 5:
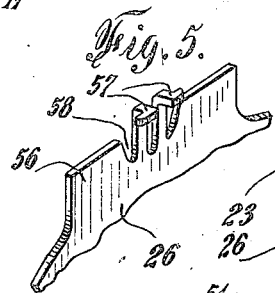
Figure 4:
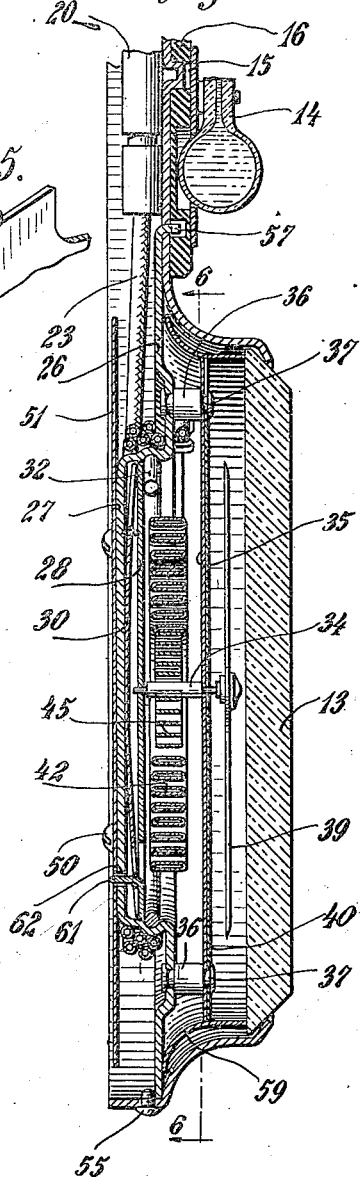
Figure 6:
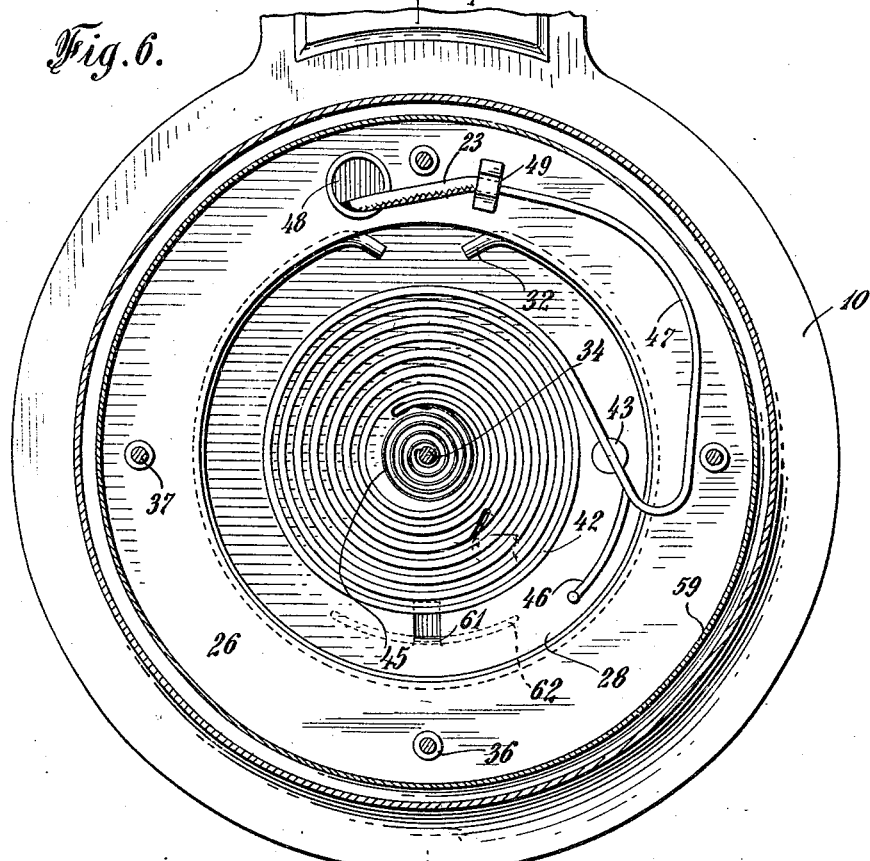
Figure 7:
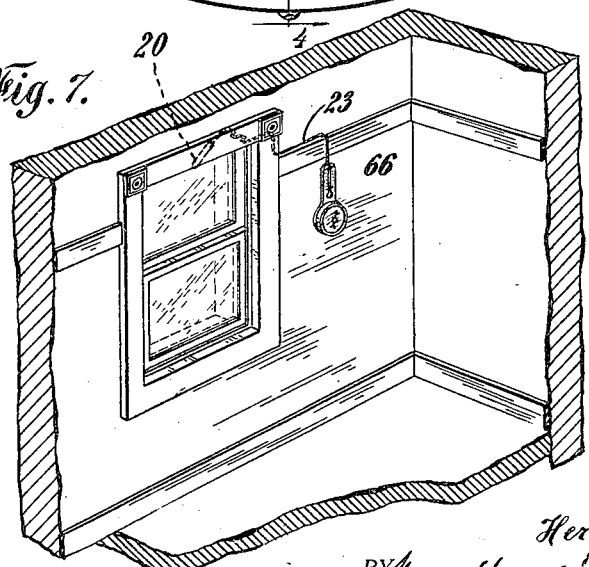

The invention will be understood from the following description taken in connection with the accompanying drawings in which is illustrated a temperature indicating instrument having the invention embodied therein, and in which Figure 1 is a front elevation; Figure 2 is a side elevation partly in section; Figure 3 is a rear elevation; Figure 4 is a sectional side elevation on the line 4—4 of Figure 6 of the lower portion of the instrument; Figure 5 is a fragmentary perspective view of one of the elements of the instrument; Figure 6 is a sectional elevation on the line 6—6 of Figure 4; Figure 7 is a fragmentary perspective view showing how the instrument may be conveniently installed within a building; and Figure 8 is a plan view of the top of the instrument frame showing particularly a slot therein.

Referring to the drawings, the indoor-outdoor thermometer therein shown has a frame having a circular portion 10 and a radially extending portion 11, said frame being provided with a cavity in its back. This frame may be of any suitable material, such as sheet metal formed to the desired shape, and the circular portion of the frame is provided in its front with an opening adapted to receive and be closed by a crystal 13 in a manner hereinafter described. Secured to the outside or front of the radially extending portion 11 of the frame is the indoor temperature responsive and indicating means, such as a bulb thermometer 14 having a co-operating scale plate 15, suitable slow heat-conducting material such as a piece of fibre 16 being interposed between the scale plate 15 and the supporting frame 11. At its upper end the instrument frame is shown as provided with a perforated lug 18 by which the instrument may be conveniently hung on a nail or screw inserted in the wall.

The outdoor thermometer portion of the instrument will now be described. In order that the temperature responsive element of this portion of the instrument may be located out of doors, it is made movable and consists of a bulb 20, of any suitable form, which during distribution of the instrument may be removably held in the cavity in the back of the portion 11 of the frame by clips 21 secured to the frame and adapted to receive the temperature responsive element. The temperature responsive element 20 is operatively connected with the outdoor temperature indicating means, hereinafter described in detail, by a flexible connection 23 which may be of any suitable kind, but is shown as comprising a capillary tube of the kind described and claimed in my co-pending application, Serial No. 590,276, filed Sept. 25, 1922. Ordinarily, the instrument is provided with a considerable length of flexible tubing 23, say fifteen feet, and a supporting structure in the nature of a spool is provided in the cavity of the frame portion 10 upon which the major portion of said tube may be coiled, while the bulb 20 is mounted in the clips 21. This spool, which will be hereinafter described, also serves to hold that portion of the tube 23 which it is unnecessary to use when the instrument is installed with the bulb out-of-doors, this amount of unnecessary tubing being variable depending upon the distance at which the instrument is located from the point at which the bulb is mounted.

The details of the structure of the outdoor temperature indicating means are best shown in Figures 3 to 6. From these figures, it will be apparent that these parts are located within the cavity in the circular portion 10 of the frame. The various parts of the temperature indicating mechanism are shown as mounted upon a supporting member in the form of a plate 26 having a cup-shaped portion 27. Located in the cup-shaped portion 27 and rotatably adjustable therein, is a disc 28, between which and the bottom of the cup-shaped portion is arranged friction increasing means in the form of a spring disc 30, which is slightly concave as viewed from the side toward the disc 28, and at its edges is provided with radial slits, the edges of which are slightly bent out of line with one another in order to increase the friction between the edge of the spring disc 30 and the disc 28. The disc 28, which is rotatably held within the cup-shaped portion of the supporting member by a spring ring 32, is provided with a hole which serves as a rear bearing for a spindle 34, the outer end of which passes thru and is journaled in a hole in a plate 35 secured to but spaced from the supporting member 26 by posts 36 riveted to the supporting member and receiving screws 37 which pass thru the plate 35. At its outer end, the spindle 34 carries a pointer 39 which co-operates with a scale which may be embossed directly upon the plate 35, but is preferably embossed on a separate dial plate 40 secured to the plate 35 in any suitable manner, as by means of the screws 37. Spirally wound around spindle 34 is a Bourdon tube 42, which at one end passes thru and is rigidly connected to post 43 (Fig. 6) secured to the disc 28, and at the other end is connected to one end of a reversely wound bi-metallic compensating spring 45, the inner end of which is connected to the spindle 34; the said tube and spring being preferably arranged in substantially the same plane. The outer end of the Bourdon tube 42 is provided with an extension 46 for filling purposes, and is connected to a looped portion 47 of the tube 23 which passes thru a hole 48 in the supporting member 26, and is anchored to said supporting member in any suitable manner as by clips 49 punched out of the supporting member 26 and bent into snug engagement with the tube 23. Secured to the back of the cup-shaped portion 27 of the supporting member 26 by any suitable means such as screws 50, is a circular plate 51 which extends beyond the edges of the cup-shaped portion of the supporting member 26. Upon this spool, the major portion of the flexible connecting tube 23 may be coiled in the manner shown in Figure 4, while the bulb 20 is held by the clips 21; and from this spool any amount of the tube 23 may be uncoiled when the instrument is being installed, a notch 53 being formed in the top of the flange of the radially extending portion 11 of the frame, to permit the tube 23 to be led out from the cavity within said frame. By making the notch 53 curved, as best shown in Figure 8, it becomes possible to lead the tube 23 out at the center of the top of the instrument, which produces a symmetrical arrangement.

The supporting member 26 may be secured within the circular portion 10 of the frame in any suitable manner. As shown, the supporting member is made of a shape to fit the inside of the back flange of the frame portion 10, and the latter is provided with one or more screws 55 which co-operate with the edge of the supporting member 26 as clearly shown in Figures 3 and 4. At its top, the member 26 is preferably provided with a radially extending portion 56 which extends a short distance up into the cavity in the portion 11 of the frame; and punched out and formed in this portion 56 of the supporting member are lugs 57, of the form best shown in Figure 5, which are adapted to enter a slot in the portion 11. The ends of the lugs 57 are preferably beveled as shown, and the lugs have enough spring action so that in assembling the instrument it is merely necessary to force the supporting member toward the frame, whereupon the offset ends of the lugs 57 will enter the slot in the frame and will spring back into a position in the front of the frame portion 11, thereby locking the member 26 to the frame. The ends of the lugs 57 may be hidden by the pieces of fibre 16 in the back of which a cavity may be formed to receive these lugs as clearly shown in Figure 4. If at any time it is necessary to remove the supporting member 26 from the frame, the lugs 57 can easily be sprung back and disengaged from the slot by inserting and turning the end of a screwdriver in the notches 58 at each side of the lugs 57.

Interposed between the supporting member 26 and the crystal 13 is a sheet metal ring 59 of the form best shown in Figure 4. It will be noted that this ring is so formed that it is capable of exerting a spring action upon the crystal 13, thereby holding the latter snugly in engagement with the outer flange portion of the frame portion 10 after the instrument is assembled. In practice, the various parts of the temperature indicating mechanism of the outdoor thermometer are assembled on the supporting member 26, the crystal 13 and the ring 59 are inserted in the frame portion 10, and the supporting member 26 with all the parts carried thereby is then inserted in the frame and locked in place in the manner above mentioned.

The instrument may be calibrated by the rotation of the disc 28 carrying the post 43 to which one end of the Bourdon tube is attached as above described, such rotation of the disc 28 causing movement of the pointer 39 over the scale 40. In order to permit the disc 28 to be rotated without disassembling the instrument, a lug 61 is punched out of the disc to a position at substantially right angles thereto, and said lug is passed through a hole in the spring disc 30, thru a slot in the portion 27 of the plate 26, and thru a slot 62 in the plate 51 upon which a suitable scale and notation may be embossed, as is clearly shown in Figures 3 and 4.

The instrument may be shipped and distributed to the user arranged in the form shown in Figures 1, 2 and 3, with the bulb 20 held by the clips 21 in the cavity of the frame, and with the tube 23 coiled on the spool formed by the supporting member 26 and the plate 51. It will be noted that this facilitates easy packing and safe handling of the instrument.

Figure 7 gives a general idea of the manner in which the instrument may be installed within the room of a building. As shown the bulb 20 is hung up outside and near the top of a window, and the tube 23 is led in at the top of the window frame which may be slightly grooved in order to permit the sash to be closed without jamming the tube; or if desired, the top of the window sash may be slightly grooved for the same purpose. The tube 23 is then led along the wall 66 of the room, preferably adjacent mouldings if possible, until the point is reached where it is desired to hang the instrument. The instrument is then hung by the perforated lug 18 from a nail or screw in the wall, any surplus length of the tube 23 being coiled upon the spool provided within the instrument, and the tube being led out from the cavity within the instrument thru the notch 53 provided for that purpose. When properly installed, the tube 23 is inconspicuous and does not detract from the attractive appearance of the instrument.

While I have shown one form in which the invention may be embodied, it is to be understood that the construction shown may be modified in many respects without departing from the spirit of the invention, and that it is my intention to cover all such modifications in the appended claims.

What I claim is:

1. A thermometer comprising a frame, temperature indicating means carried by said frame and visible from the front thereof, a temperature responsive element, a flexible connection connecting said element to operate said indicating means, and means carried by said frame for removably holding said element and the major portion of said flexible connection.

2. A thermometer comprising a frame, having a cavity at its back, temperature indicating means carried by said frame and visible from the front thereof, a temperature responsive element, a flexible connection operatively connecting said element with said indicating means, and means located in the cavity of said frame for removably holding in the cavity said element and the major portion of said flexible connection.

3. A thermometer comprising a frame having a cavity at its back, temperature indicating means carried by said frame and visible from the front thereof, a temperature responsive element, a flexible connection operatively connecting said element with said indicating means, means located in the cavity of said frame for removably holding said element in said cavity, and a spool located in the cavity of said frame upon which the major portion of the flexible connection may be wound.

4. An indoor-outdoor thermometer comprising a frame having a circular portion and a radially extending portion and having a cavity in its back, indoor temperature responsive and indicating means carried by the radially extending portion of said frame and visible from the front thereof, outdoor temperature indicating means carried by the circular portion of said frame and visible from the front thereof, a movable temperature responsive element, a flexible connection operatively connecting said element with the outdoor temperature indicating means, and means located in the cavity of said frame for removably holding said element and the major portion of said flexible connection.

5. An indoor-outdoor thermometer comprising a frame having a circular portion and a radially extending portion both having cavities in their backs, indoor temperature responsive and indicating means carried by the radially extending portion of said frame and visible from the front thereof, outdoor temperature indicating means carried by the circular portion of said frame and visible from the outside or front thereof, a movable temperature responsive element, a flexible connection operatively connecting said element with the outdoor temperature indicating means, means located in the cavity in the circular portion of said frame for removably holding the major portion of said flexible connection, and means located in the cavity in the radial extension of said frame for removably holding said element.

6. An indoor-outdoor thermometer comprising a frame having a circular portion and a radially extending portion both having cavities in their backs, indoor temperature responsive and indicating means carried by the radially extending portion of said frame and visible from the front thereof, outdoor temperature indicating means carried by the circular portion of said frame and visible from the front thereof, a movable temperature responsive element, a flexible connection operatively connecting said element with the outdoor temperature indicating means, a spool located in the cavity of the circular portion of said frame for removably holding the major portion of said flexible connection, and clips located in the cavity of the radially extending portion of said frame for removably holding said element.

7. In a temperature indicating device, a supporting member having a cup-shaped portion, a disc rotatably arranged therein, friction increasing means co-operating with said supporting member and with said disc, a dial plate mounted on said supporting member and spaced therefrom, a spindle journaled in said disc and in said dial plate, a pointer carried by said spindle and co-operating with said dial plate, a Bourdon tube arranged between said disc and said dial plate, one end of said tube being connected to said disc and the other end operatively connected to said spindle, and means for rotating said disc whereby the device may be calibrated.

8. In a temperature indicating device, a supporting member having a cup-shaped portion, a disc rotatably arranged therein, friction increasing means co-operating with said supporting member and with said disc, a dial plate mounted on said supporting member and spaced therefrom, a spindle journaled in said disc and in said dial plate, a pointer carried by said spindle and co-operating with said dial plate, a Bourdon tube arranged between said disc and said dial plate, one end of said tube being connected to said disc and the other end operatively connected to said spindle, and a projection from said disc extending thru said supporting member whereby said disc may be rotated and the device calibrated.

9. In a temperature indicating device, a supporting member having a cup-shaped portion, a temperature indicating means carried by said supporting member on its cupped side, a plate secured to the back of said supporting member and extending beyond the edges of the cup-shaped portion, thereby forming a spool, a temperature responsive element and a flexible connection between said temperature element and temperature indicating means for operating the latter from the former, the major portion of this connection being coiled upon said spool.

10. A frame having a flange and a lug projecting from said flange, said flange being provided with a slot extending from the edge of said flange to a location opposite the middle of said lug.

11. In an instrument, a Bourdon tube spirally wound, a temperature compensating spring also spirally wound and attached to the inner end of the tube, both the tube and the spring being arranged in substantially the same plane, and an indicator operating shaft connected to the compensating spring at the center thereof for actuation thereby.

12. In an instrument, a Bourdon tube spirally wound, means for adjustably holding the outer end of the tube stationary, a temperature compensating spring also spirally wound, a rotatable member to which the inner end of said spring is attached, and means connecting the inner end of said tube and the outer end of said spring.

13. In an instrument, a Bourdon tube spirally wound, means for adjustably holding the outer end of the tube stationary, a temperature compensating spring also spirally wound, a rotatable member to which the inner end of said spring is attached, means for frictionally holding said supporting member in any position, and means connecting the inner end of said tube and the outer end of said spring.

14. In an instrument, a Bourdon tube spirally wound, a supporting member rotatably adjustable around the axis of the spirally wound tube, to which member the outer end of said tube is attached, a temperature compensating spring also spirally wound and attached at its outer end to the inner end of the tube, both the tube and the spring being arranged in substantially the same plane, and a member mounted for rotation on the axis of the tube and the spring for operating thereby to which member the inner end of the spring is attached.

15. A thermometer for separately indicating the temperatures at a plurality of locations comprising a casing, means mounted on the casing for indicating the temperature at the casing, a second temperature indicating means including a pointer and a scale, mounted on the casing adjacent the first, means for relatively adjusting the pointer and scale to render the readings thereof accurate, a temperature responsive element, and long, flexible operating connections between said element and the adjustable temperature indicating means, enabling the temperature responsive element to be located at a distance from the casing in operation and to be brought to the casing for comparison of the two indicating means when subjected to the same temperatures, so that the adjustable temperature indicating means may be tested and set at any time by reference to the other temperature indicating means.

16. An indoor-outdoor thermometer comprising a frame arranged to be hung upon a wall, indoor temperature responsive and indicating means carried by said frame and visible from the front thereof, outdoor temperature indicating means carried by the frame and visible from the front thereof, a movable temperature responsive element, a flexible connection operatively connecting said element with the outdoor temperature indicating means, and a spool located within the frame at the back thereof upon which the flexible connection may be wound.

17. In a distance type indicating instrument, a body portion including a support-engaging back having a cavity therein, said body including indicator mechanism, a controlling device for the indicator mechanism located at a distance therefrom, a long flexible pressure transmitting tube connecting the controlling device to the indicator mechanism to operate the latter, and a spool completely contained within the cavity in the body portion, on which the connecting tube may be wound.

In testimony whereof I have affixed my signature to this specification.

HERMAN SCHLAICH.